United States Patent
Good

(10) Patent No.: US 10,627,580 B2
(45) Date of Patent: Apr. 21, 2020

(54) REVERSIBLE POLARITY MPO FIBER OPTIC CONNECTOR WITH A REMOVABLE KEY

(71) Applicant: Nexans, Courbevoie (FR)

(72) Inventor: Paul Michael Good, Downingtown, PA (US)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/022,145

(22) Filed: Jun. 28, 2018

(65) Prior Publication Data

US 2019/0137695 A1    May 9, 2019

Related U.S. Application Data

(63) Continuation of application No. 15/071,968, filed on Mar. 16, 2016, now Pat. No. 10,031,296.

(51) Int. Cl.
*G02B 6/38* (2006.01)

(52) U.S. Cl.
CPC ......... *G02B 6/3831* (2013.01); *G02B 6/3882* (2013.01); *G02B 6/3885* (2013.01); *G02B 6/3887* (2013.01); *G02B 6/3893* (2013.01)

(58) Field of Classification Search
CPC .................................. G02B 6/38; G02B 6/00
USPC ........................................................ 385/59
See application file for complete search history.

(56) References Cited

U.S. PATENT DOCUMENTS

| | | | | |
|---|---|---|---|---|
| 5,129,023 A | * | 7/1992 | Anderson | G02B 6/3831 385/60 |
| 5,619,604 A | * | 4/1997 | Shiflett | G02B 6/3869 385/52 |
| 5,915,058 A | * | 6/1999 | Clairardin | G02B 6/3825 385/77 |
| 6,154,597 A | * | 11/2000 | Roth | G02B 6/3825 385/139 |
| 6,497,516 B1 | * | 12/2002 | Toyooka | G02B 6/3882 385/78 |

(Continued)

OTHER PUBLICATIONS

International Search Report dated Mar. 28, 2017.

*Primary Examiner* — Kaveh C Kianni
(74) *Attorney, Agent, or Firm* — Sofer & Haroun, LLP

(57) ABSTRACT

A multi-fiber, fiber optic connector has a housing having a first end for receiving a multi-fiber fiber optic cable and a second end having openings for said fibers from said cable. First and second key slots are provided for accepting a removable key for setting the polarity of the fibers within the connector, with the first and second key slots located on opposing sides of the connector. The connector has guide pins or guide pin receiving holes for guiding the connection with a second connector. The removable key is movable between the first and second key slots, the key slot with the removable key corresponding to a first active slot and the key slot without the removable key corresponding to a non-active slot. When the removable key is in the first key slot, it results in the first key slot being active with the fibers being presented within the connector in a first polarity. When the removable key is moved from the first key slot to the second key slot, activating the second key slot and deactivating the first key slot, the fibers are presented within the connector in a second polarity, reversed from the first polarity.

4 Claims, 6 Drawing Sheets

(56) References Cited

U.S. PATENT DOCUMENTS

| | | | | |
|---|---|---|---|---|
| 6,530,696 B1* | 3/2003 | Ueda | G02B 6/3885 | 385/59 |
| 6,830,382 B1* | 12/2004 | Deane | G02B 6/4292 | 385/88 |
| 8,520,986 B2* | 8/2013 | Dailey | G01D 5/35303 | 250/227.11 |
| 8,632,352 B2* | 1/2014 | Wagner | H01R 13/5812 | 439/352 |
| 2001/0007603 A1* | 7/2001 | Sakurai | G02B 6/3885 | 385/60 |
| 2004/0052472 A1* | 3/2004 | Roth | G02B 6/3849 | 385/56 |
| 2005/0018982 A1* | 1/2005 | Watte | G02B 6/3809 | 385/98 |
| 2005/0069264 A1* | 3/2005 | Luther | G02B 6/3821 | 385/59 |
| 2011/0229083 A1* | 9/2011 | Dainese J nior | G02B 6/3869 | 385/74 |
| 2012/0027359 A1* | 2/2012 | Katoh | G02B 6/3885 | 385/78 |
| 2012/0082416 A1* | 4/2012 | Katoh | G02B 6/3831 | 385/72 |
| 2012/0099822 A1* | 4/2012 | Kuffel | G02B 6/383 | 385/78 |
| 2013/0028555 A1* | 1/2013 | Dailey | B32B 7/02 | 385/12 |
| 2013/0136402 A1* | 5/2013 | Kuffel | G02B 6/3806 | 385/81 |
| 2013/0170797 A1* | 7/2013 | Ott | G02B 6/3885 | 385/60 |
| 2013/0322825 A1 | 12/2013 | Cooke et al. | | |
| 2014/0147078 A1* | 5/2014 | Bhagavatula | G02B 6/32 | 385/33 |
| 2015/0378113 A1 | 12/2015 | Good et al. | | |
| 2016/0259135 A1* | 9/2016 | Gniadek | G02B 6/3885 | |

\* cited by examiner

METHOD A POLARITY

| FERRULE POSITION | FIBER CODE |
|---|---|
| 1 | BLUE |
| 2 | ORANGE |
| 3 | GREEN |
| 4 | BROWN |
| 5 | SLATE |
| 6 | WHITE |
| 7 | RED |
| 8 | BLACK |
| 9 | YELLOW |
| 10 | VIOLET |
| 11 | ROSE |
| 12 | AQUA |

METHOD A POLARITY

| FERRULE POSITION | FIBER CODE |
|---|---|
| 1 | BLUE |
| 2 | ORANGE |
| 3 | GREEN |
| 4 | BROWN |
| 5 | SLATE |
| 6 | WHITE |
| 7 | RED |
| 8 | BLACK |
| 9 | YELLOW |
| 10 | VIOLET |
| 11 | ROSE |
| 12 | AQUA |

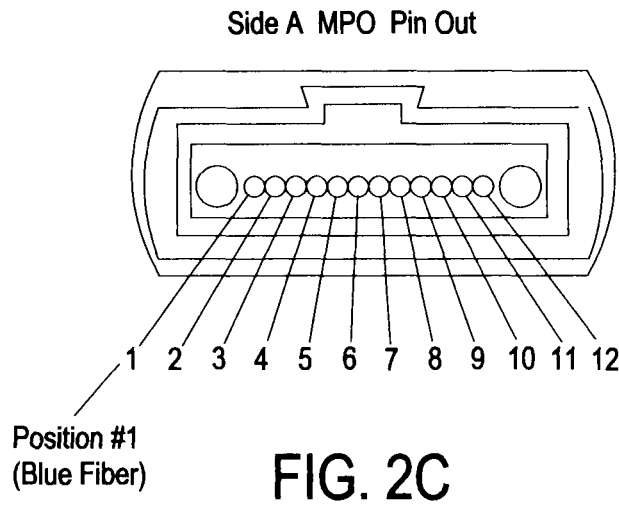
FIG. 2C METHOD B POLARITY
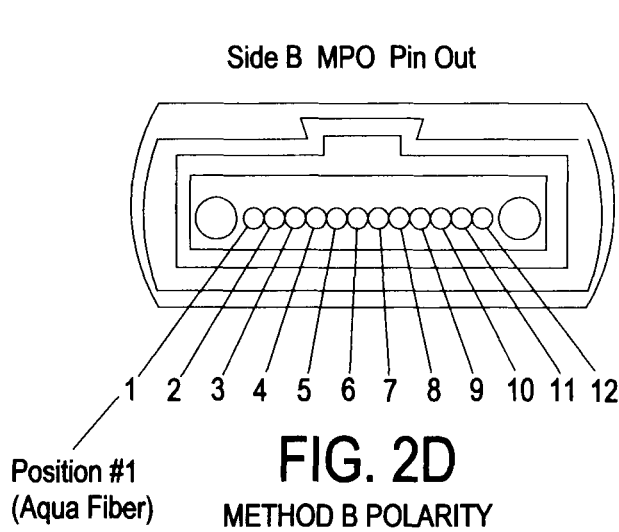
FIG. 2D METHOD B POLARITY

MPO CONNECTOR

REVERSIBLE POLARITY MPO FIBER OPTIC CONNECTOR WITH A REMOVABLE KEY

RELATED APPLICATION

This application is a continuation of U.S. patent application Ser. No. 15/071,968, filed on Mar. 16, 2016, which in turn is a continuation-in-part of related to U.S. patent application Ser. No. 13/934,378, filed on Jul. 3, 2013, the entirety of which are incorporated by reference.

BACKGROUND

Field of the Invention

The present arrangement relates to fiber optic connectors. More particularly, the present arrangement relates to fiber optic connectors with reversible polarity.

Description of the Related Art

In the area of fiber optic connections, typical fiber optic systems usually have to establish a bi-directional pathway between a transmitter port on a first element and receiver port on a second element and vise versa. See for example schematic FIG. 1. In order for such a bi-directional systems to function, it is a requirement that one end of a fiber be connected to the light emitting source of a first equipment, often a type of laser or light emitting diode, and the other end connected to a receiver port on a second equipment. For the second fiber in the bi-directional pathway, the other fiber needs to be connected to the light source on the second equipment and, at the other end, the receiver port of the first equipment.

Fiber optic connectors used for larger high-speed fiber optic systems often use multi-fiber cables supporting many bi-directional pathways. In one example the cables typically have 12 fibers in the cable, with the corresponding connectors for such cables housing multiple fiber optic members within the same connector body. Such a twelve fiber arrangement can support six of such bi-directional (duplex) pathways.

These connectors used for such high-speed fiber optic systems often employ what are termed multiple fiber optic members, called MPO (Multiple-Fiber Push-On/Pull-off) connectors and they typically support the twelve fiber (six duplex channel) arrangements within the same connector body.

Using FIG. 1 showing a single two way channel, there can be many segments of fibers between two components, each representing a fiber optic cable with a connector. In some cases, between segments, the fibers in the connector of a first segment pass directly across to the fibers of the second segment. However, in some cases, in order for the transmission signal to end up at the correct receiver port, at least one segment connection, the connectors must have the pin/fiber input/output on one side flipped so that the transmission signal exits on the other fiber in the channel.

This situation is referred to as connector "polarity" for each segment.

A fiber cable segment with two connectors at either end that result in the same polarity across the segment is referred to as method A and a fiber cable segment with two connectors at either end that result in a flip in the polarity across the segment is referred to as method B. In FIG. 1, the first four segments are method A polarity, the fifth segment is method B polarity exhibiting a flip in the light pathways across the two fibers.

Depending on the various fiber optic equipment arrangements, in the prior art, to make the correct connections, the installer selects cable segments (i.e. pre-terminated lengths of cable) that have the correct polarity. The openings in the transceivers and adapters have a key opening and the corresponding MPO connectors on the cable have a key (see e.g. the trapezoid shaped "key" element. The MPO connectors will only fit into the slot with the key in the right space. For example, if an installer requires a polarity A connection, the two connectors on the end will have keys that force their insertion into the desired transceivers/adapters with the resulting connection being that shown in FIGS. 2A and 2B. If an installer requires a polarity B connection ("flip"), the two connectors on the end will have keys that force their insertion into the desired transceivers/adapters with the resulting connection being that shown in FIGS. 2C and 2D. As such bi-directional pathways connected with pre-terminated cables using MPO connectors, must still eventually result in one end of a fiber being connected to a source and the other end connected to a receiver and vice versa for each bi-directional pathway supported. As shown in FIGS. 2A and 2B, the top FIGS. 2A and 2B show Method A polarity where the blue fiber starts on position 1 on one connector on one side of the segment and is at the same location (position 1) on the other connector on the other side of the segment. This method A polarity arrangement would be a straight forward connection that passes the same connection polarity to the next segment of the installation.

FIGS. 2C and 2D show Method B polarity where the blue fiber starts on position 1 on one connector on one side of the segment and is at the opposite location (position 12) on the other connector on the other side of the segment. With Method B polarity the remaining fibers in the connector on the second side of the segment are all also transposed in position vis-à-vis the first connector. The management of connections in such MPO connectors between sources and receivers and the polarity of such connections is described in the standard TIA-568-C.3. This method B polarity arrangement would be a connection that reverses the connection polarity going forward to the next segment of the installation.

As shown in FIG. 1, in order for the light signal from one source to reach a receiver at the other end there typically must be an odd number of 'flips' in the cabling, where a 'flip' indicates a method B polarity segment, so that the fiber in connector position 1 is connected to position 2 on the other side, the fiber in connector position 2 is connected to position 1 on the other side, etc. . . . .

These flips can be achieved via individual fiber assemblies and/or in the adapters that connect different fiber optic cabling segments together for example as shown in the basic design in FIG. 1 at segment 5. However, since fiber optic networks are dynamic environments, connections are often added or subtracted and the number of required flips changes within the cabling arrangement between equipment. Ensuring that there are an odd number of flips then requires one or more of the fiber optic assemblies' polarity to be changed as the connections are added or subtracted. This requires the installers and/or end users to stock connection cables with MPO type connectors at either end of both type A and type B polarities and lengths for every possible network configuration, given that connection cables are pre-terminated with MPO type connectors of a fixed polarity. For example, the connection cables are typically pre-terminated with the MPO connectors and associated keying arrangement meaning that a particular patch cable is either a polarity A type cable or a polarity B type cable. One type of cord (e.g. type A) cannot be easily converted to a type B type cord.

When preparing an initial fiber optic arrangement (e.g. transceivers, adapter and patch cables) at a given location, the required polarity of fiber optic segments/cable connections is carefully considered during the design phase and is generally fixed upon completion because, as noted above, the patch cords come pre-terminated and the polarity of the connector(s) is set at manufacture. Returning to the concept of the relative arrangement of the keys on the connectors for fixing the polarity type of the patch cords, a patch cord having connectors for its end set at a first polarity (i.e. method A or method B) can only be used for example in FIG. 1 at certain segment locations. However, if for any reason the configuration changed, as will be explained in more detail below, the installer may require a new patch cord, possibly of a different length, and having its two connectors set at a different polarity. Consequently, end users must carry a large inventory of pre-terminated assemblies or order additional parts to allow for reconfigurations of the network topology.

As noted above, the polarity of an MPO (Multiple-Fiber Push-On/Pull-off) style connector, whether it be method A or method B is determined by the relationship between the fibers and a "key" on the connector body, which is why polarity is sometimes referred to as "keying."

Prior art FIG. 3 shows a perspective view of a standard prior art MPO connector (shown in FIGS. 2A-2D in front axial direction) that has a single fixed key on its body. A cable having such a MPO type connection pre-terminated thereon will thus have its polarity set at the time of manufacture.

Some prior art arrangements have the ability to change the key/polarity of the connector by allowing for a changing of the key arrangement on the connector from one side to the other (i.e. if done on one side of a cable it would reverse the pre-terminated cable from type A polarity to type B polarity), these solutions require the disassembling and reassembling of connectors or the purchase of new connectors. This solution would allow an existing connection pre-terminated cable to be converted from one polarity to another to be re-used, for example when an existing fiber optic arrangement is re-arranged and requires a differ polarity connection. However, such connectors that require complicated means for changing the key/polarity setting on a connection, is time consuming and increases labor costs and/or material costs associated with these modifications.

OBJECTS AND SUMMARY

The present arrangement overcomes the drawbacks associated with the prior art and provides for a reversible polarity MPO type connector that can be used for pre-terminating a multi-fiber fiber optic cable. The reversible polarity MPO type connector has a removable key that can be easily moved from one side of the connector (e.g. top) to the other side (e.g. bottom) so that by changing one connector's polarity, the existing cable or patch cable can be re-used in a existing fiber optic arrangement undergoing modification (and possibly changing the number of "flips" between the transmitter and receiver) without worry of previous installation types or designs. The reversible polarity connector and removable (and re-insertable) key reduces installer's and customer's inventory, installation time, and ultimately lowers their cost as they can easily and quickly adjust the polarity of an existing cable.

Such a connector employs a removable key that allows a user to reverse the polarity of the connector without the need to open the connector housing. Additionally, the present connector can be employed in conjunction with a universal connector pin arrangement that also allows a user to remove and/or insert the key on the desired side of the MPO connector so that the cable can accommodate both polarities, again without the need for opening the connector body.

To this end a multi-fiber, fiber optic connector is provided. The connector has a housing having a first end for receiving a multi-fiber fiber optic cable and a second end having openings for said fibers from said cable. First and second key slots are provided for accepting a removable key for setting the polarity of the fibers within the connector, with the first and second key slots located on opposing sides of the connector. The connector has guide pins or guide pin receiving holes for guiding the connection with a second connector. The removable key is movable between the first and second key slots, the key slot with the removable key corresponding to a first active slot and the key slot without the removable key corresponding to a non-active slot. When the removable key is in the first key slot, it results in the first key slot being active with the fibers being presented within the connector in a first polarity. When the removable key is moved from the first key slot to the second key slot, activating the second key slot and deactivating the first key slot, the fibers are presented within the connector in a second polarity, reversed from the first polarity.

BRIEF DESCRIPTION OF THE DRAWINGS

The present invention can be best understood through the following description and accompanying drawings, wherein:

FIGS. 2A-2D are schematic views of fiber optic arrangements and their polarity configurations;

DETAILED DESCRIPTION

Figures 4A, 4B:
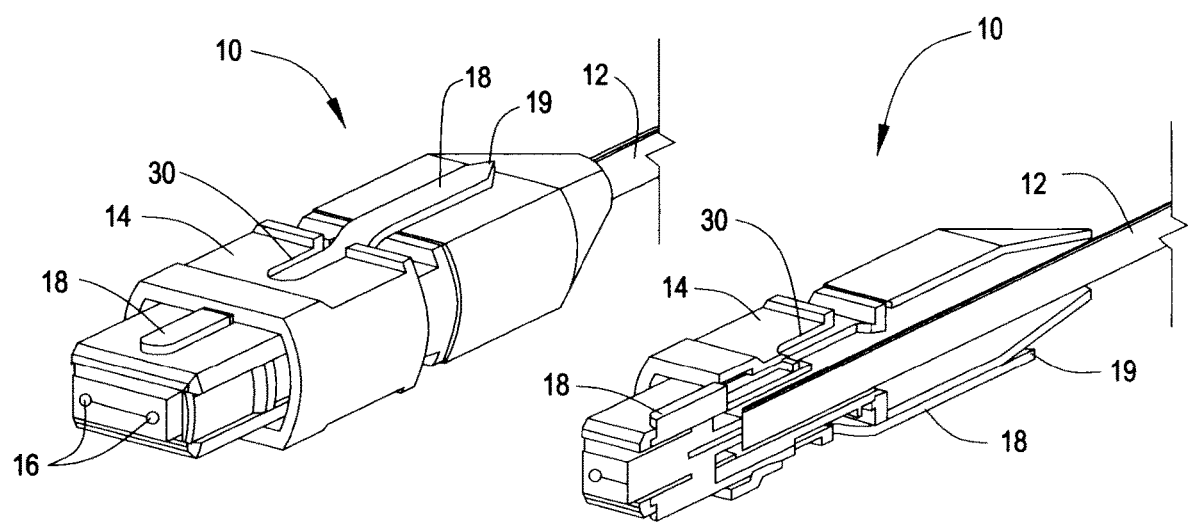
FIGS. 4A and 4B show a reversible polarity connector, in accordance with one embodiment.

In one embodiment of the present arrangement as shown in FIGS. 4A and 4B a connector 10 is provided at the end of a multi fiber cable 12. Connector 10 has a housing and quick release 14, strain relief/boot 15, guide pins/guide pin openings 16 and a removable key 18 that fits into a corresponding channel 30 that extends back through housing 14 and in some instances extending further back through strain relief/boot 15. The opposite side of connector 10 has a mirrored slot 30' (see e.g. FIG. 5) so that key 18 may be removed from one side of connector 10 to the other, or, in other words, moved from slot 30 and re-inserted on slot 30' as discussed in more detail below. It is noted that connector 10 is shown with guide pin openings 16 (female) but all of the features of the present arrangement are equally applicable to connectors 10 with male pins extended/present as well.

As a basic explanation, the "key" (18) sets the order for which the fibers in connector 10 are presented to an additional opposing connector 10. A receiver or transmitter has a key hole or opening that only allows a connector to fit in one way, with the key matching. It will not go in upside down (which would arrange the fibers left to right in the opposite direction) For this application when key 18 is on an 'active' side that refers to the side of the connector on which key 18 is inserted, either one of slot 30 or 30'. If a key is said to be reversed then it means that key 18 is removed from slot 30/30' on side of connector 10 and reinserted in slot 30/30' on the opposite side of connector 10 (now reversing which side of 10 connector is "active" or can be inserted into a receiver/transmitter/adapter). If connectors of both regular and reversed active keys are compared, it would be found that the fibers in connector 10 are presented to an opposing connector in opposite order.

A typical cable 12 has two connectors 10, one either side and the setting of keys 18 on the two connectors is what sets the polarity (arrangement of fibers from cable 12) for connector 10 from the perspective of an opposing connector. Changing one key 18 from slot 30/30' to the other slot 30/30' in a connector 10 on one side of cable 12, while not moving key 18 on connector 10 on the other side of cable 12 would change the polarity from/to method A to/from method B (see e.g. FIGS. 2A-2D).

Thus, as shown in FIG. 4A, key 18 positioned on the top of connector 10 is in a forward extended position within slot 30. As shown in cut-away FIG. 4B, key 18 is positioned in slot 30 on the top of connector 10 in a forward position with slot 30' on the bottom of connector 10 empty. Key 18 has a long extended tab 19 that passes under quick release 14 within slot 30 and either passes over strain relief/boot 15, or through strain relief/boot 15 if slot 30 extends that far. In Picture 4A, extended tab 19 passes over strain relief/boot 15 but if desired, slot 30 can be extended through strain relief/boot 15 to allow extended tab 19 to rest therein, depending on the desired specifications of the customer.

Such an arrangement allows for key 18 to be moved from one side to the other of connector 10, to alternately allow either side of connector 10 to be the "active" side. If a cable 12 has such a connectors 10 on one or both sides then if removable key 18 is moved from one side of the connector (e.g. top slot 30) to the other side (e.g. bottom slot 30') it will change the connection polarity of cable 10 from type A to type B.

Applicants note that there are two slots 30 and 30' for key 18 on connector 10 so that a fiber optic segment/cable 12 having two connectors 10 on either end may exhibit both A & B polarities options by moving key 18 between slots 30/30' on one of either connector 10. When a user wants a fiber optic segment to be polarity A, the user simply removes keys 18 from slot 30 on the top of one connectors 10 to slot 30' on the bottom of connector 10 switching the order of fibers (i.e. left to right) at that connector 10 reversing the setting of cable 12 from/to method A/B polarity.

When key 18 is moved from slot 30 to slot 30', nothing physically changes with the fibers in cable 12 in connector 10. Rather, the only change with connector 10 is a flipping of the order the fibers within cable 12 on one side by flipping which side of connector 10 is "active" on that side of cable 12 (while keeping the other side's key setting the same. If both keys 18 were switched on both connectors on either side of cable 10 at the same time the polarity would remain the same).

It is noted that nothing is moving within housing 14. Fiber position number is always referenced, by one of ordinary skill in the art, by holding the key up and looking from left to right. By having a key 18 that can be moved to opposing sides of connector 10 with the ability to "activate" one side or the other of connector 10, this changes the definition of "up" for that connector. In other words, with a movable key 18 on connector 10 and the ability to easily change which slot 30/30' key 18 is located in and thus what side of connector 10 is "active" (used to determine which way is "up"). This allows the user to reverse the order of the fibers presentation on a one connector 10 on one end of an assembly only, switching cable 10 from a Method A to a Method B or vice-versa.

Moreover, in the cut away example FIG. 4b, connector 10 shows key 18 in top slot 30 and bottom slot 30' empty. As is evident from FIGS. 4A and 4B, key 18 can be moved from slot 30 to 30' (or vise versa) to change the orientation of one connector 10 (changing the polarity of cable 12), without the need for opening any part of connector 10, such as housing 14, unlike the prior art configurations. Moreover, a removable key 18 and slot 30/30' configuration is easy to manufacture and does not require significant modifications to the prior.

Figure 1:
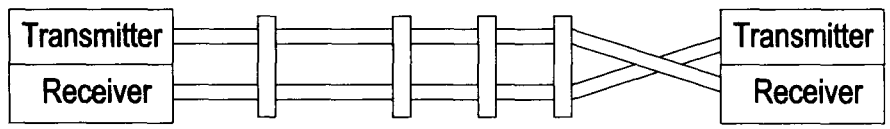
FIG. 1 is a schematic view of a typical fiber optic arrangement of fiber optic equipment and connectors.
Figure 2A:
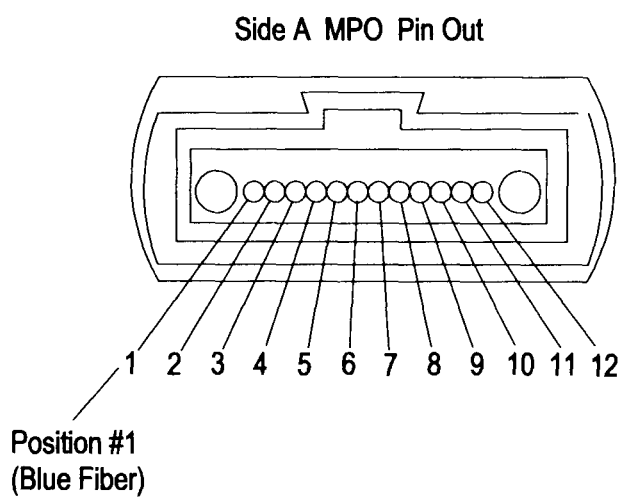
Figure 2B:
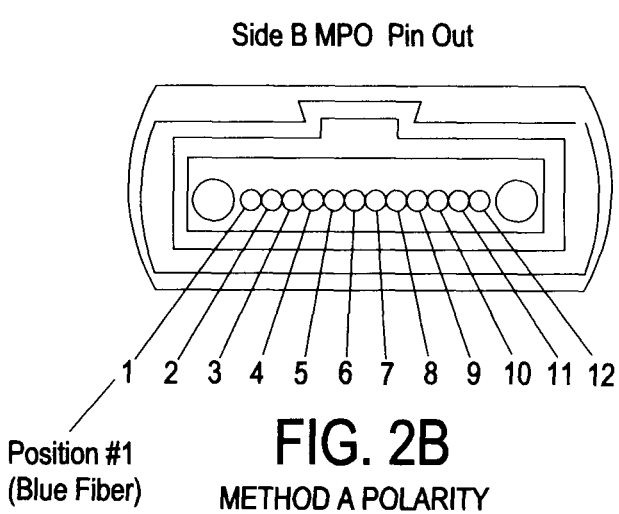
Figure 3:
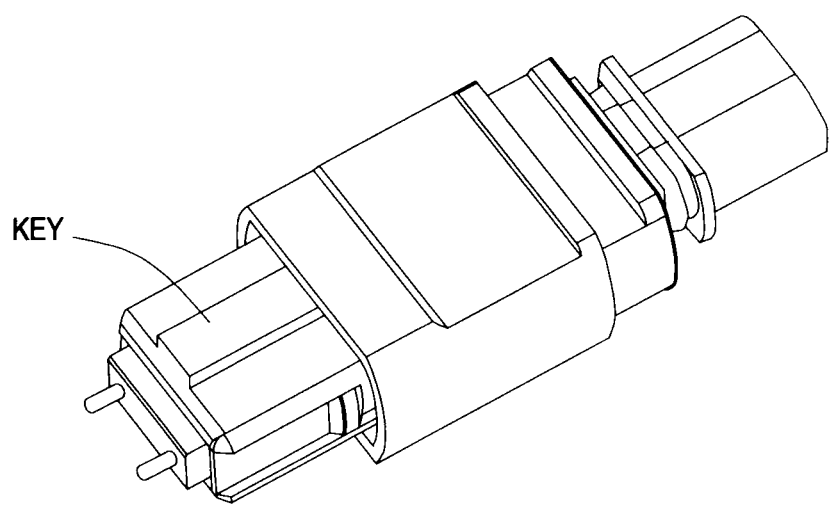
FIG. 3 shows a prior art fixed key MPO type connector.
Figure 5:
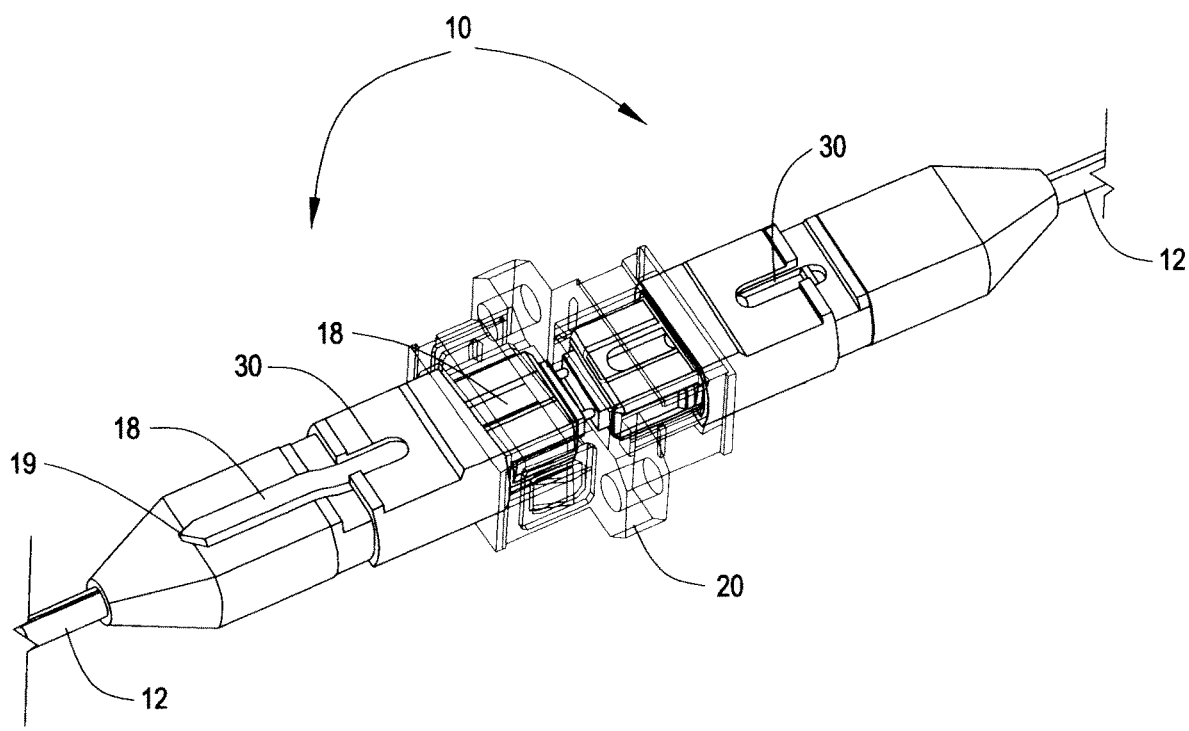
FIG. 5 shows two reversible polarity connectors in an adapter, in accordance with one embodiment.

FIG. 5 shows two connectors 10 fitted into an adapter 20 which are used to connect two cables/patch cords 12 in the case where multiple cables are needed to span between the transmitter and the receiver (see e.g. FIG. 1 where adapters 20 would be located at the vertical segment dividers. Such a key arrangement, as shown in FIG. 5, has key 18 in slot 30 on the top of connector 10 on cable 12 entering adapter 20 from the left and key 18 located in slot 30' (not visible) on the bottom of connector 10 on cable 12 entering adapter 20 from the right. In addition to being able to change a key arrangement of a connector that is to be inserted into the receiver or transmitter it can also be changed at an adapter location illustrated here, by moving key 18 from slot 30/30' to the other on one of these two connectors 10. Key 18 can thus be moved from slot 30/30' easily using extended tab 19 with no need for specialized tools and without disassembly of connector 10, as keys 18 and extended tab 19 are within slot 30 are accessible through an opening in housing 14.

It is noted that key 18 and extended tab 19 are identified with different element numbers but that is only for functionally explaining their use within the context of this invention. Removable key 18 is typically made from a semi-rigid or rigid polymer, usually the same material used for housing/quick release 14. Such material is typically selected to be able to withstand the stresses, strain and wear associated with about 100 or more mating cycles. The width, dimensions, and overall size of removable key 18 is generally specified in industry standards such as IEC 1754-7 and TIA/EIA 604.5 and other standards pertinent to MPO type connectors.

Figure 6A:
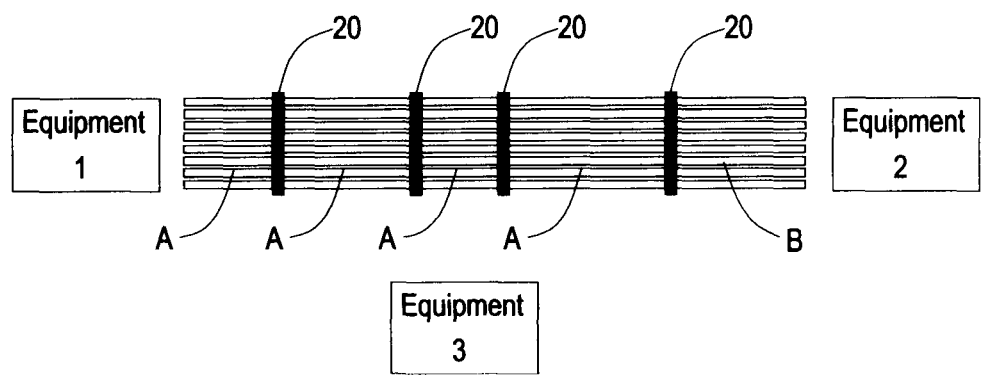
FIGS. 6A and 6B illustrate an exemplary fiber optic arrangement making use of reversible polarity connectors, in accordance with one embodiment.
Figure 6B:
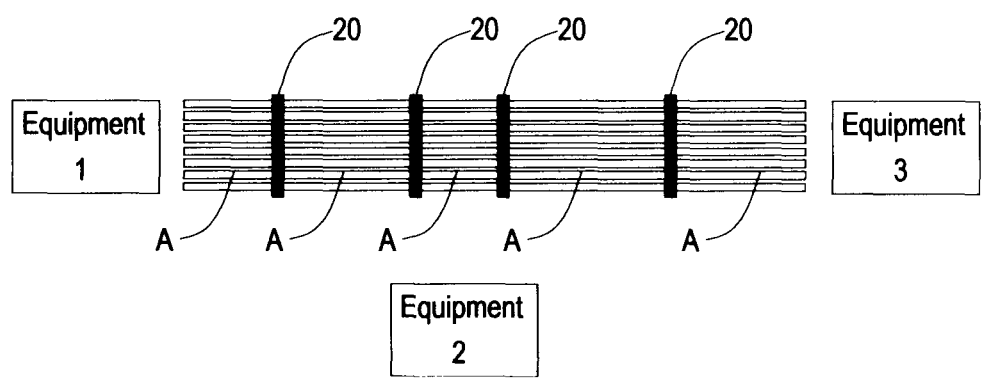

One exemplary arrangement for demonstrating the usefulness of connector is shown in FIGS. 6A and 6B. In FIG. 6A, a first equipment #1 is shown connected to a second equipment #2 using five spans of fiber with MPO type connectors on such spans at four locations (#1-#4). That is, at each location #1-#4, there is an adapter 20 and two opposing MPO connectors, one for each segment on either side of the adapter. The cables 12 between equipment 1 and adapter 1 and between adapters 2-4 are each polarity A type cables that maintain the same polarity from the prior segment (Method A polarity) In this arrangement and example, the span/cable 12 between connector adapter 4 and equipment 2 requires a polarity reverse so cable 12 therebetween is a Method B polarity cable 12 reversing the fiber order left to right from the prior segment (Method A polarity) from one side of cable 12 to the other.

Turning now to FIG. 6B, assuming that owing to some required connection change, equipment #2 now needs 0 be replaced by equipment #3, that requires the last cable 10 to be polarity A (i.e. same all the way across) As a result the prior cable 10 in the last segment needs to have the polarity changed. Under the prior art, with fixed key pre-terminated cables the installer would need to either change a connector or get a new cable for the segment. Using the present arrangement key 18 on one connector 10 in cable 12 between adapter 4 and equipment 3 can be moved as needed between slot 30/30' and the polarity of that cable 12 is now correct for the updated arrangement. The existing pre-terminated cable 10 can be used with only minimal effort to move key 18 between slots 30/30'. Even if the installer was using prior art connectors that could change polarity, they would be of the type that required the installer to open the housing of the connector and change the polarity and reassemble the connector, possibly damaging/diminishing that connector and the fiber connections therein.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-fiber, fiber optic connector, said connector comprising:
    a housing having a first end for receiving a multi-fiber fiber optic cable and a second end having openings for said fibers from said cable, said housing having a strain relief; and
    first and second key slots for accepting one removable key structure for setting the polarity of said fibers within said connector, with said first and second key slots located on opposing sides of said connector, said one removable key having an extended tab portion;
    wherein said one removable key is movable between either one of said first and second key slots, said key slot with said removable key therein corresponding to a first active slot and said key slot without said one removable key therein corresponding to a non-active slot, such that when said one removable key is in said first key slot, resulting in said first key slot being active, said fibers are presented within said connector in a first polarity and when said one removable key is removed from said first key slot and inserted in said second key slot, activating said second key slot and deactivating said first key slot, said fibers are presented within said connector in a second polarity, reversed from said first polarity, and
    wherein said extended tab portion of said one removable key, when positioned in either one of said first and second key slot, extends backwards out of said first or second key slot over said strain relief of said housing.

2. The multi-fiber, fiber optic connector as claimed in claim 1, wherein said first and second key slots are formed, at least in part, within said housing.

3. The multi-fiber, fiber optic connector as claimed in claim 1, wherein said one removable key is movable between said first and second key slots by sliding in and out of said first and second slots.

4. The multi-fiber, fiber optic connector as claimed in claim 1, wherein said one removable key in either said first and second key slots is accessible through said housing, such that said one removable key can be moved between said first and second key slots without opening said housing.

* * * * *